US010694227B2

(12) United States Patent
Kawaguchi et al.

(10) Patent No.: US 10,694,227 B2
(45) Date of Patent: Jun. 23, 2020

(54) VIDEO TRANSMISSION SYSTEM AND VIDEO TRANSMISSION METHOD

(71) Applicant: Panasonic Intellectual Property Management Co., Ltd., Osaka (JP)

(72) Inventors: Yoshifumi Kawaguchi, Kyoto (JP); Yusuke Kamotani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/843,180

(22) Filed: Dec. 15, 2017

(65) Prior Publication Data

US 2018/0205974 A1 Jul. 19, 2018

(30) Foreign Application Priority Data

Jan. 13, 2017 (JP) .................................. 2017-003812
Oct. 27, 2017 (JP) .................................. 2017-207834

(51) Int. Cl.
| | |
|---|---|
| *H04N 7/173* | (2011.01) |
| *H04N 21/2343* | (2011.01) |
| *H04N 21/845* | (2011.01) |
| *H04L 29/06* | (2006.01) |
| *H04N 21/234* | (2011.01) |
| *H04N 21/233* | (2011.01) |

(52) U.S. Cl.
CPC ....... *H04N 21/2343* (2013.01); *H04L 65/601* (2013.01); *H04N 21/23424* (2013.01); *H04N 21/8456* (2013.01); *H04N 21/2335* (2013.01)

(58) Field of Classification Search
None
See application file for complete search history.

(56) References Cited

U.S. PATENT DOCUMENTS

| | | | | | |
|---|---|---|---|---|---|
| 5,793,895 | A | * | 8/1998 | Chang .................... | H04N 19/61 375/240.02 |
| 6,058,141 | A | * | 5/2000 | Barger ............... | H04N 21/2368 341/141 |
| 6,075,576 | A | * | 6/2000 | Tan .......................... | H04N 7/52 348/425.4 |
| 6,381,398 | B1 | * | 4/2002 | Yamauchi ............ | G11B 27/034 386/263 |

(Continued)

FOREIGN PATENT DOCUMENTS

JP 11-341490 12/1999

*Primary Examiner* — William J Kim
(74) *Attorney, Agent, or Firm* — Wenderoth, Lind & Ponack, L.L.P.

(57) ABSTRACT

The video transmission system includes a divided-clip generator for generating first and second clips, a transmission unit for sequentially transmitting the first and second clips, and a display apparatus for displaying the first and second clips. The first clip is generated by dividing video data by a specific time period and by dividing audio data by a specific time period. The second clip is generated after the first clip. The divided-clip generator includes a video output unit and an audio output unit. The video output unit divides the video data by a first time period equal to a multiple of a unit frame time of the video data. The audio output unit divides the audio data by a second time period equal to a multiple of a unit frame time of the audio data. The end of the first time period is before the end of the second time period.

12 Claims, 9 Drawing Sheets

(56) References Cited

U.S. PATENT DOCUMENTS

| | | | |
|---|---|---|---|
| 6,512,882 B1* | 1/2003 | Teunissen | H04N 5/783 375/E7.004 |
| 6,549,578 B1* | 4/2003 | Maruya | H04N 19/174 348/414.1 |
| 6,792,047 B1* | 9/2004 | Bixby | H04N 21/23424 375/240.26 |
| 7,095,948 B2* | 8/2006 | Teunissen | H04N 5/783 375/E7.004 |
| 2002/0044609 A1* | 4/2002 | Ueda | H04N 21/4341 375/240.26 |
| 2002/0064371 A1* | 5/2002 | Seo | G11B 27/034 386/334 |
| 2003/0021298 A1* | 1/2003 | Murakami | G11B 27/105 370/535 |
| 2003/0160945 A1* | 8/2003 | Honda | H04N 21/234327 352/244 |
| 2004/0019681 A1* | 1/2004 | Nakamura | H04L 29/06 709/226 |
| 2004/0041946 A1* | 3/2004 | Gries | H04N 5/04 348/515 |
| 2008/0056358 A1* | 3/2008 | Fuchie | H04N 19/159 375/240.12 |
| 2011/0103468 A1* | 5/2011 | Polisetty | G10L 25/78 375/240.03 |
| 2013/0166580 A1* | 6/2013 | Maharajh | H04L 65/605 707/758 |
| 2014/0119432 A1* | 5/2014 | Wang | H04N 19/176 375/240.2 |
| 2014/0229976 A1* | 8/2014 | Ma | H04N 21/231 725/32 |

\* cited by examiner

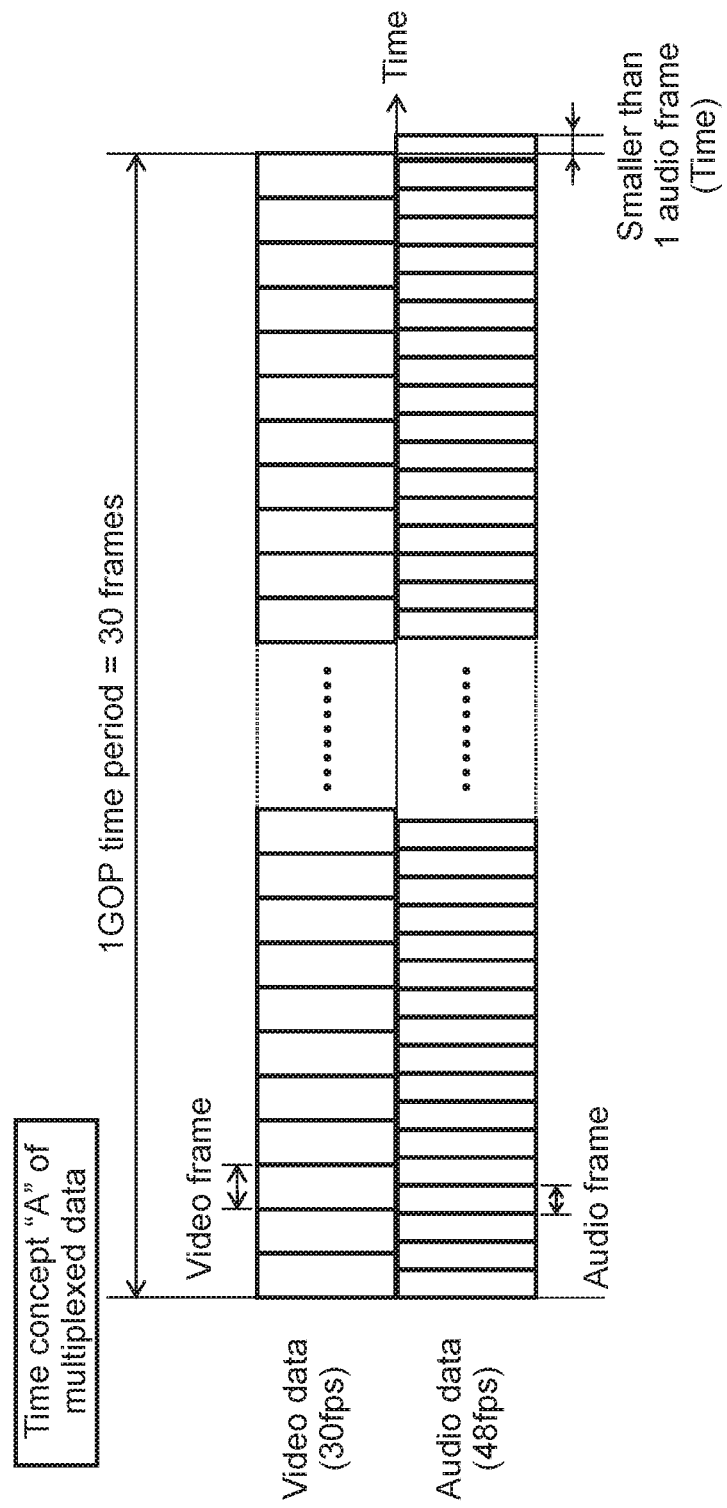

VIDEO TRANSMISSION SYSTEM AND VIDEO TRANSMISSION METHOD

BACKGROUND

1. Technical Field

The present disclosure relates to video transmission systems that perform conversion processing of converting video and audio signals into ones that have structures favorable for a server, and transmit the resultant signals to the server.

2. Description of the Related Art

Patent Literature 1 discloses a data expansion device and a data expansion method, with which the video and audio data of a clip can be output to the outside in the following manner: That is, expanding the clip causes temporal errors to accumulate. When such accumulating errors exceed a period of one frame of the audio data, the video and audio data of the clip are output with the last 1 (one) frame of the audio data being excluded. This can prevent an excessive accumulation of errors of the clip lengths of the video and audio data, which allows the data to be output to the outside with the video and audio data being in synchronization with each other.

CITATION LIST

Patent Literature

PTL 1: Japanese Patent Unexamined Publication No. H11-341490

SUMMARY

The present disclosure is intended to provide a video transmission system, an imaging-transmitting apparatus, and a cloud server. The system is effectively used in editing video and audio, which are shot by a camera, in that data of the video and audio are instantly transmitted without missing data, via a network, to the remote location where the video and audio will be confirmed for the editing. The imaging-transmitting apparatus and the cloud server configure the video transmission system.

The video transmission system according to the present disclosure includes: a divided-clip generator, a transmission unit, and a display apparatus. The divided-clip generator generates a first clip and a second clip. The first clip is generated by dividing video data by a specific time period and by dividing audio data by a specific time period. The second clip is generated after the first clip has been generated. The transmission unit sequentially transmits, to a server via a network, the first and second clips generated by the divided-clip generator. The display apparatus displays the first and second clips that have been transmitted. The divided-clip generator includes a video output unit and an audio output unit. The video output unit divides the video data by a first time period equal to a multiple of a unit frame time of the video data. The audio output unit divides the audio data by a second time period equal to a multiple of a unit frame time of the audio data. The end of the first time period is before the end of the second time period.

A video transmission method according to the present disclosure includes the steps of: generating divided-clips, transmitting the clips, and displaying the clips. In the step of generating the divided-clips, a first clip and a second clip are generated. The first clip is generated by dividing video data by a specific time period and by dividing audio data by a specific time period. The second clip is generated after the first clip has been generated. In the step of transmitting the clips, the first and second clips generated in the step of generating the divided-clips are sequentially transmitted to a server via a network. In the step of displaying the clips, the first and second clips that have been transmitted are displayed. The step of generating the divided-clips includes the steps of: dividing the video data by a first time period equal to a multiple of a unit frame time of the video data; and dividing the audio data by a second time period equal to a multiple of a unit frame time of the audio data. The end of the first time period is before the end of the second time period.

With the video transmission system, video currently being shot with a camera can be confirmed instantly at a remote location.

BRIEF DESCRIPTION OF DRAWINGS

FIG. 4A is a view illustrating time concept "A" of multiplexed data according to the first embodiment;

DETAILED DESCRIPTION OF THE PREFERRED EMBODIMENT

Hereinafter, detailed descriptions of embodiments will be made with reference to the accompanying drawings as deemed appropriate. However, descriptions in more detail than necessary will sometimes be omitted. For example, detailed descriptions of well-known items and duplicate descriptions of substantially the same configuration will sometimes be omitted, for the sake of brevity and easy understanding by those skilled in the art.

Note that the accompanying drawings and the following descriptions are presented to facilitate hilly understanding of the present disclosure by those skilled in the art and, therefore, are not intended to impose any limitations on the subject matter described in the appended claims.

First Exemplary Embodiment

Hereinafter, a first embodiment will be described with reference to FIGS. 1 to 8.

1.1. Configuration

Figure 1:
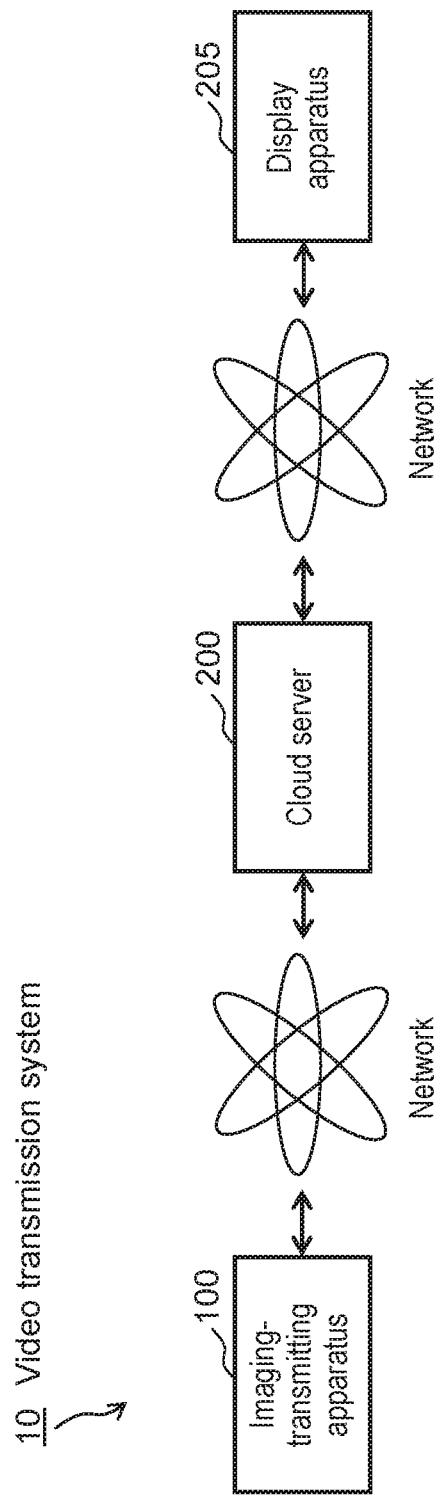
FIG. 1 is a block diagram of a configuration of a video transmission system according to a first embodiment.

FIG. 1 is a block diagram of a configuration of a video transmission system according to the first embodiment. Video transmission system 10 includes: imaging-transmitting apparatus 100, cloud server 200, and display apparatus 205, with these being coupled with each other via a network.

Figure 2:
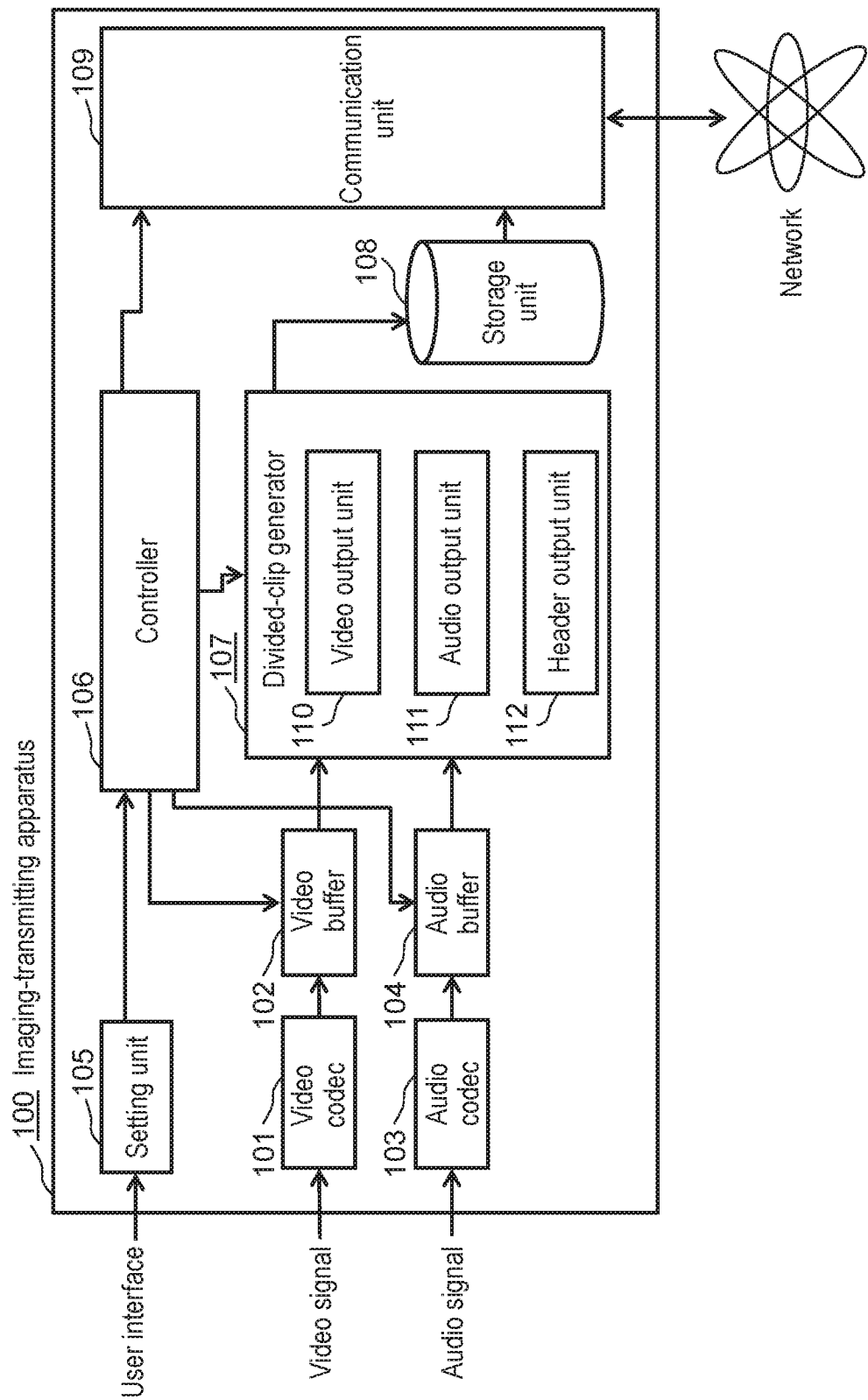
FIG. 2 is a block diagram of a configuration of an imaging-transmitting apparatus according to the first embodiment.

FIG. 2 is a block diagram of a configuration of the imaging-transmitting apparatus according to the first embodiment. Imaging-transmitting apparatus 100 includes: video codec 101, video buffer 102, audio codec 103, audio buffer 104, setting unit 105, controller 106, divided-clip generator 107, storage unit 108, and communication unit 109. Moreover, divided-clip generator 107 is configured with video output unit 110, audio output unit 111, and header output unit 112.

Imaging-transmitting apparatus 100 causes video codec 101 to encode video signals that are received from a camera, and causes video buffer 102 to temporally store the resulting encoded signals. The encoded video data stored in video buffer 102 are ones without missing data, with which continuous video signals can be reproduced by decoding the data. Moreover, imaging-transmitting apparatus 100 causes audio codec 103 to encode audio signals that are received from a microphone, and causes audio buffer 104 to temporally store the resulting encoded signals. The encoded audio data stored in audio buffer 104 are ones without missing data, with which continuous audio signals can be reproduced by decoding the data.

Setting unit 105 transmits, to controller 106, a dividing time period of clips that is selected by a user from among candidates (e.g. 10 seconds, 30 seconds, 60 seconds, 120 seconds, etc.) for the dividing time period of clips, with the candidates having been offered via a user interface. Note that, the dividing time period of clips that has been designated by the user or the like may be temporally stored after the dividing time period has been inputted by the user or the like, before being transmitted to controller 106. Moreover, the term "clips" used in the present application indicates the individual files in cases where a string of video (including a video signal and an audio signal) is divided into specific files.

Controller 106 controls video buffer 102, audio buffer 104, and divided-clip generator 107, thereby dividing the video to generate a plurality of clip files, in accordance with the dividing time period designated by setting unit 105. The clip files are stored in storage unit 108. The thus-generated clip files are transmitted by communication unit 109 to cloud server 200 at any time via the network, under the control of controller 106. In case of error in the communication processing, communication unit 109 is controlled so as to transmit the files again to cloud server 200, with the files being perfect without any missing data. Communication unit 109 is an example of a transmission unit.

Divided-clip generator 107 is configured with video output unit 110, audio output unit 111, and header output unit 112. Divided-clip generator 107 generates clip files each of which has a file structure shown in FIG. 5, and stores the generated clips in storage unit 108. Video output unit 110 of divided-clip generator 107 causes storage unit 108 to record encoded video data every one Group of Picture (1GOP), until time reaches the end of the dividing time period. Audio output unit 111 causes storage unit 108 to record encoded audio data that correspond to the encoded video data, until time reaches the end of the dividing time period.

Upon ending of the dividing time period, header output unit 112 records header data. This completes the output of the clip file. In this case, the recording is controlled such that the time period of each of the frames of the encoded video and encoded audio data every GOP except for the last GOP becomes equal to the corresponding frame length indicated in 'time concept "A" of multiplexed data' shown in FIG. 4A. Therefore, at the end of every GOP, a difference in reproduction end time between the last video frame and the last audio frame, becomes smaller in time duration than 1 (one) audio frame.

Moreover, when the shooting is finished, header output unit 112 is caused to record header data, thereby completing the output of the clip files. In this case, for the last GOP, the recording is controlled such that the time period of each of the frames of the encoded video and encoded audio data becomes equal to the corresponding frame length indicated in 'time concept "B" of multiplexed data' shown in FIG. 4B. Therefore, at the end of the last GOP, a difference in reproduction end time between the last video frame and the last audio frame, becomes smaller in time duration than 1 (one) audio frame.

Figure 3:
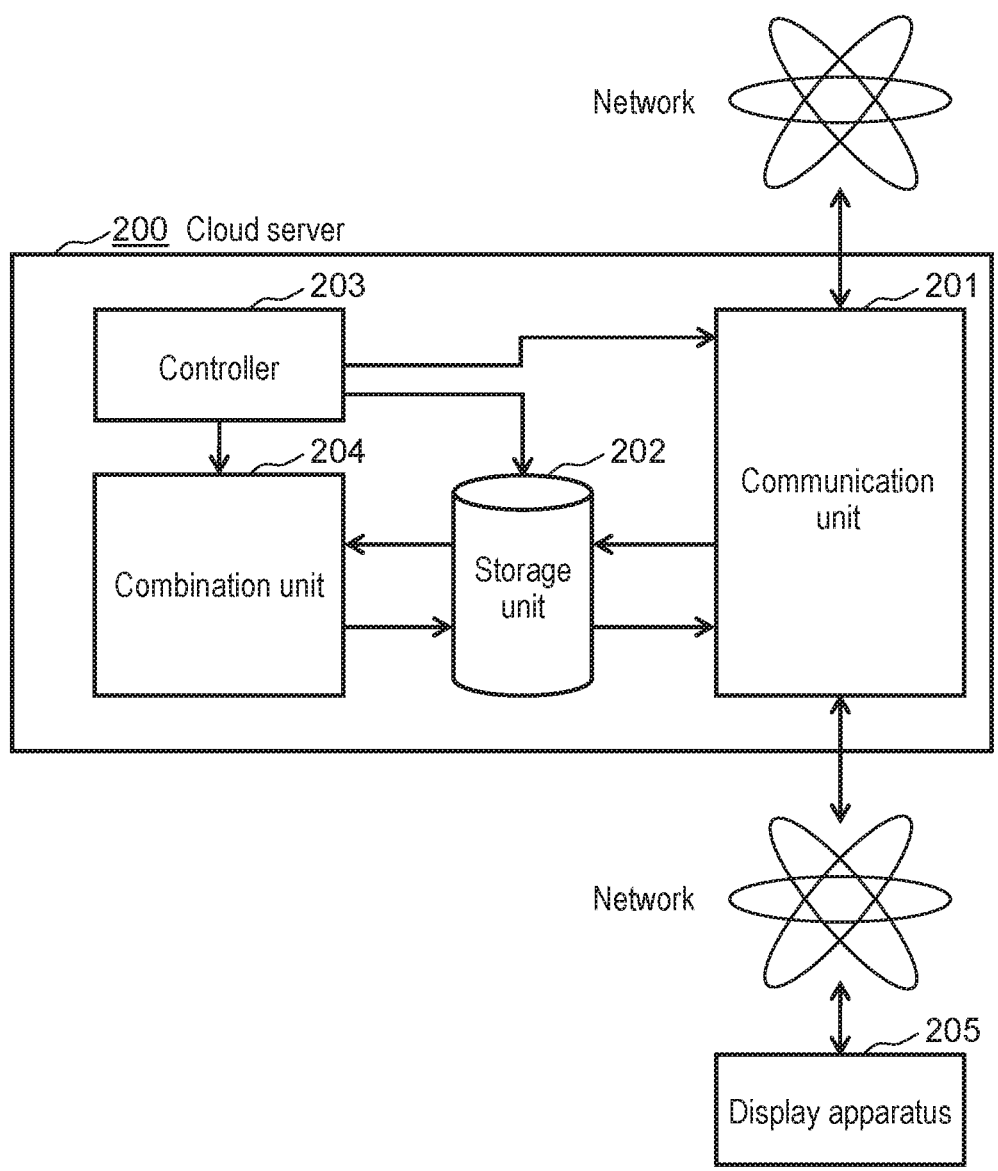
FIG. 3 is a block diagram of a configuration of a cloud server according to the first embodiment.

FIG. 3 is a block diagram of a configuration of a cloud server according to the first embodiment. Cloud server 200 is configured with communication unit 201, storage unit 202, controller 203, and combination unit 204.

Upon receiving clip files with communication unit 201, cloud server 200 stores them in storage unit 202.

Storage unit 202 stores videos fed from communication unit 201 and combination unit 204.

Combination unit 204 receives clips from storage unit 202, generates shot files from the clips, and then transmits the resulting shot files to storage unit 202. Note that the term "shot" used in the present application indicates a unit of a string of video recording from a start to a halt of shooting. The shot is divided into some videos; each of the divided videos is referred to as a "clip." Moreover, a file as well in which two or more clips are connected is referred to as a shot, for the sake of convenience. A shot is one that, for example, is formed by combining clips shown in FIG. 6; therefore, the reproduction time period of a shot file is equal to the sum of reproduction time periods (associated with the number of frames) of all the corresponding clip files.

Controller 203 controls communication unit 201, storage unit 202, and combination unit 204. Controller 203 instructs communication unit 201 to store clip files in storage unit 202. Upon newly recording, in storage unit 202, of a clip file belonging to a shot in cases where another clip file belonging to the same shot has already been stored in storage unit 202, controller 203 instructs that these clip files are transmitted to combination unit 204. Controller 203 instructs combination unit 204 to combine these clip files to generate a shot file.

Controller 203 causes communication unit 201 to transmit the shot file stored in storage unit 202 to display apparatus 205 via the network. In this case, controller 203 may transmit the clip files together with the shot file to display apparatus 205.

Display apparatus 205 renders a video to show it to a user who is going to edit the video while confirming its shot files. In cases where the clip file is transmitted, display apparatus 205 can also render the video reproduced from the clip file, for the sake of editing by the user.

Display apparatus 205 provides the user with a function with which the latest shot file is acquired from communication unit 201 of cloud server 200 and is reproduced and displayed, which enables the user to confirm the latest shot file. With this function, the user can manipulate, the reproduction of the video that is being displayed on display apparatus 205, with accuracy on a frame basis, thereby determining editing-dividing positions. Moreover, in cases where the clip files and the shot file are updated in cloud server 200, controller 203 causes communication unit 201 to transmit the latest-combined shot file to display apparatus 205.

Figure 5:
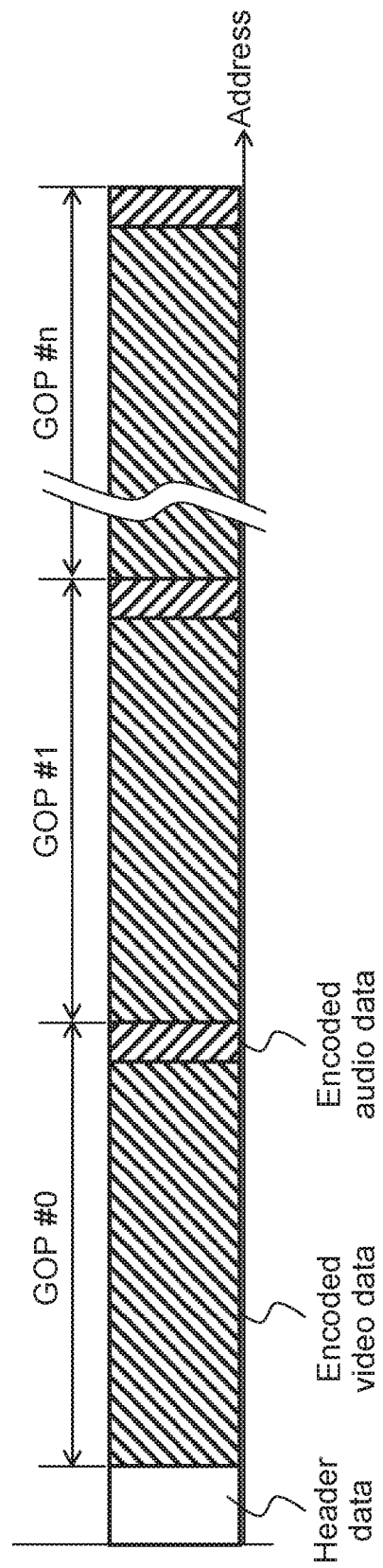
FIG. 5 is a view illustrating a structure of a clip file according to the first embodiment.

Here, each of the clip files and the shot file is stored in storage unit 202, with the file being recorded in the file structure shown in FIG. 5. That is, in the file structure, the file contains all the frames of the video, and the reproduction time period of the file is equal to the sum of time periods associated with the number of the frames of the video. For this reason, by referring to information, which is described in the header data, on a presentation time stamp (PTS) and the address of encoded data, it is possible to conduct seek reproduction of either the clip or the shot to obtain a targeted video and sound.

Figure 4B:
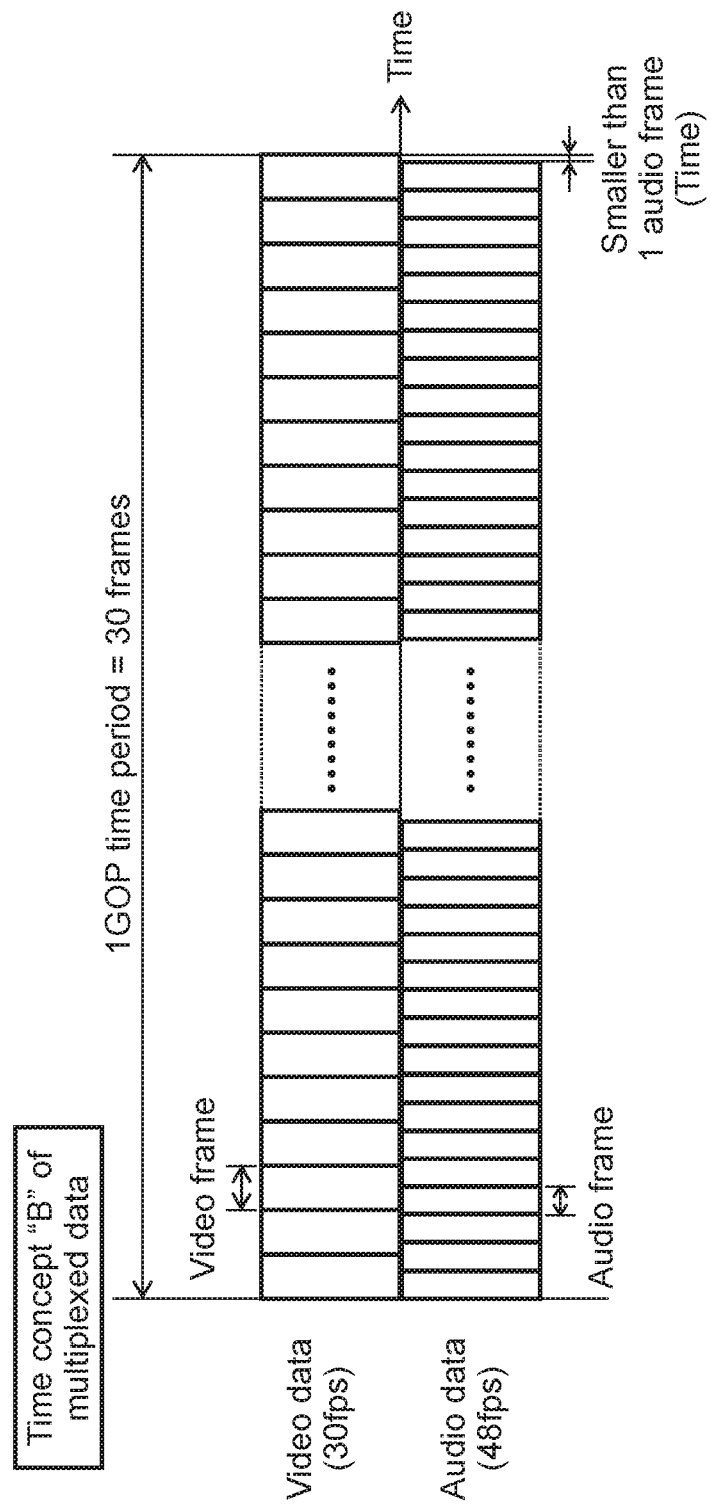
FIG. 4B is a view illustrating time concept "B" of multiplexed data according to the first embodiment.

FIGS. 4A and B are views illustrating time concepts of multiplexed data according to the first embodiment. As illustrated, a frame length (e.g. 30 fps in this description) of video data is generally different from a frame length (e.g. 48 fps in this description) of audio data. There exists a relation that 'video frame length'>'audio frame length;' therefore, they show temporal structures as shown FIGS. 4A and 4B. For this reason, at any boundary between the GOPs, the audio reproduction end time does not always coincide with the corresponding video reproduction end time. Likewise, in cases where the video frame length is 60 fps, there exists a relation that 'video frame length'<'audio frame length.' Therefore, at any boundary between the GOPs, the audio reproduction time does not always coincide with the corresponding video reproduction time.

FIG. 5 is a view illustrating a structure of the clip file (MP4), which is a storage format for multiplexed data, according to the first embodiment. In the clip file, header data, encoded video data (H.264) which are video data, and encoded audio data (AAC) which are audio data, are stored in this order from the beginning. In the header data, management information, such as addresses of the video and audio, time information, and metainformation, is recorded. After the header data, encoded video data and encoded audio data are recorded in bunches every GOP. The clip is commonly configured with a plurality of GOPs. The recording method of data in a file is as follows: First, the file is opened in a recording mode. Next, encoded video data and encoded audio data of GOP #0, encoded video data and encoded audio data of GOP #1, and so on are sequentially recorded in this order. Finally, encoded video data and encoded audio data of GOP # n are recorded. After that, the header data are recorded and then the file is closed.

Figure 6:
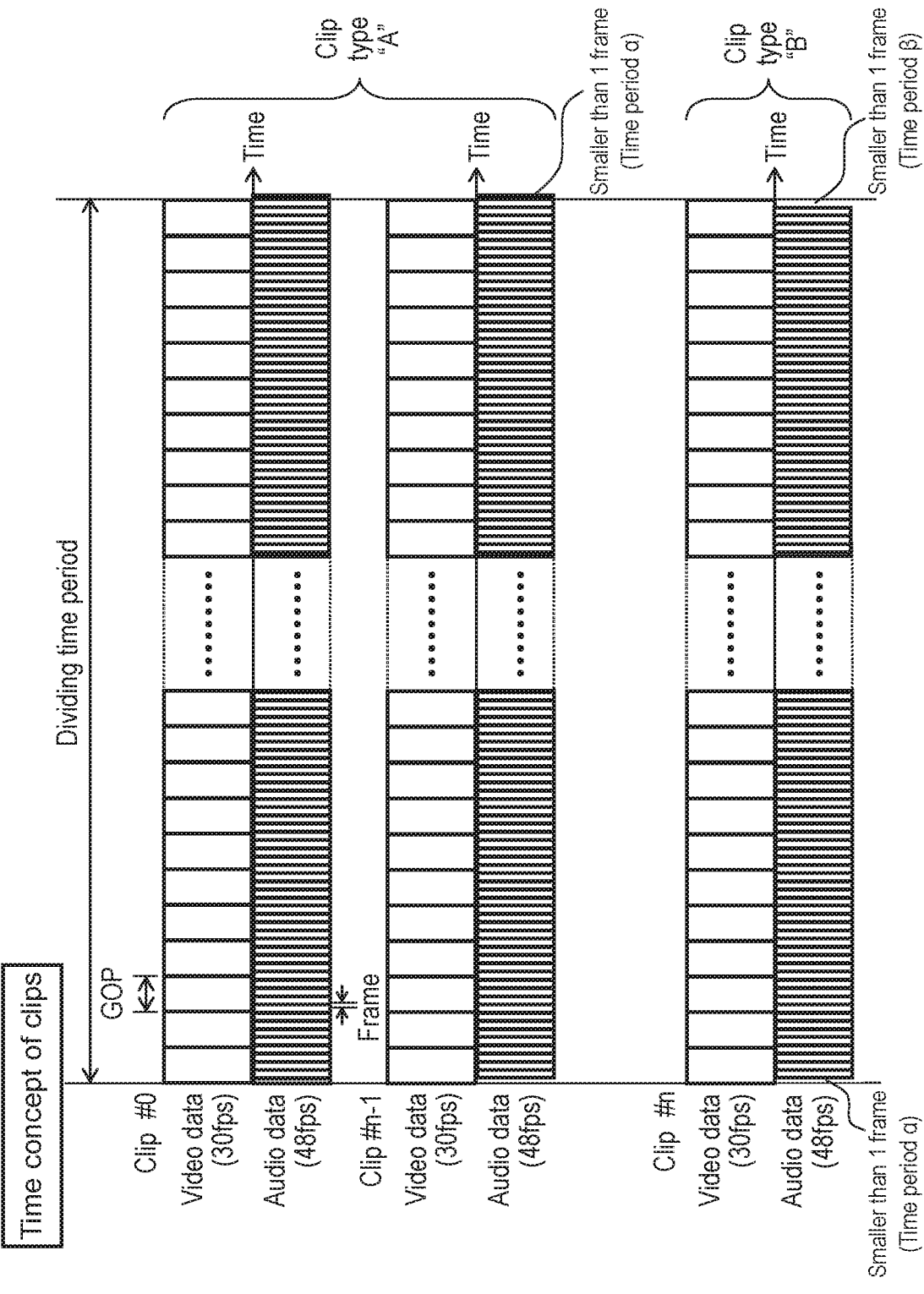
FIG. 6 is a view illustrating a time concept of clips according to the first embodiment.

FIG. 6 is a view illustrating a time concept of the clips according to the first embodiment. In clip #0, the starting video frame and starting audio frame start to be generated at the same reproduction start time. In each of clips #0 to # n−1, the reproduction end time of the last audio frame and the reproduction end time of the last video frame cannot be made equal to each other at any boundary between the GOPs, as described earlier by using FIG. 4A. For this reason, a video and audio to be divided by divided-clip generator 107 are generated such that the audio's time period to be divided is longer than the video's time period to be divided. The most preferable example includes the structure (clip type "A") that holds the relation that a difference in reproduction end time between the last audio frame and the last video frame is smaller in time duration than 1 (one) audio frame.

For this reason, in each of clips #1 to # n, a difference in reproduction start time between the starting audio frame and the starting video frame is equal in time duration to a difference in reproduction end time between the last audio frame and the last video frame in the clip immediately before the clip concerned, and is smaller in time duration than 1 (one) audio frame. For example, assuming that time period "α" is the difference in reproduction start time between the starting audio frame and the starting video frame in clip # n shown in FIG. 6, then the difference in reproduction end time between the last audio frame and the last video frame in clip # n−1 is also equal to time period "α." Moreover, in last clip # n, the ends of the video a audio are generated such that the audio end time is earlier than the video end time. As the most preferable example, the end of last clip # n has the structure (clip type "B") that holds the relation that a difference in reproduction end time between the last audio frame and the last video frame is smaller in time duration than 1 (one) audio frame (such a difference in time duration is referred to as time period "ß").

The generation of the clips having such a temporal structure alloys the definition concerning the clips as follows: In each of the clips, the presentation time stamp (A_PTS) of the starting audio frame is defined equal to not smaller than 0 (zero) when being measured with respect to a 0 (zero) reference that is set at the presentation time stamp (V_PTS) of the starting video frame. The definition allows the generation of the clip files that can be managed on a video frame basis. As a result, this leads to the relation that 'the sum of reproduction time periods of all clip files'='the sum of reproduction time periods of the corresponding shots.'

In the usual file format (e.g. MP4), in cases where a clip at some midpoint is generated to have the structure of clip type "B," the next clip file will have a structure in which an audio frame having a PTS prior to the starting video frame cannot be defined. Therefore, in the next clip file and subsequent ones, the audio frame having the PTS prior to the starting video frame needs to be deleted. In this case, when reproduction is performed straddling a boundary of such clips, noises such as cracking sounds will be caused. In contrast, in cases where a clip at some midpoint has the structure of clip type "A," data of the clip's end and data of the next clip's starting video and audio frames, are ones that are obtained by encoding continuous-video signals and continuous-audio signals. Therefore, needless to say, the video produced by decoding the last video frame of the clip's end is continuously connected to the video produced by decoding the next clip's starting video frame. The waveform of the sound produced by decoding the last audio frame of the clip's end is continuously connected to the waveform of the sound produced by decoding the next clip's starting audio frame. Therefore, when reproduction is performed straddling a boundary of these clips, noises such as cracking sounds are not caused.

Figure 7:
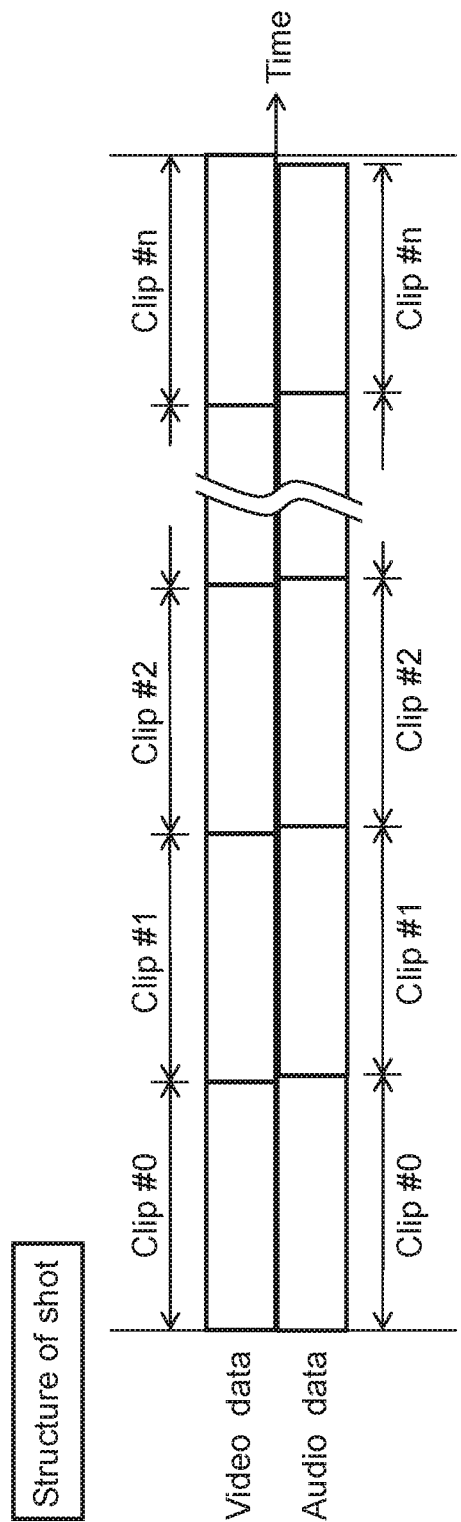
FIG. 7 is a view illustrating a structure of a shot according to the first embodiment.

FIG. 7 is a view illustrating the structure of a shot according to the first embodiment. In the present disclosure, the shot is divided into a clip every time period designated in the setting. Each of the clips is stored as the clip file shown in FIG. 5. Each of the clips has structures of the video frames and audio frames shown in FIG. 6; therefore, when the clips are combined, a seamless reproduction of the videos and audios straddling the clips is possible. Moreover, the shot is configured such that the reproduction time period of all the audios is shorter than the reproduction time period of all the video frames by a time period of 1 (one) audio frame at the maximum. With the configuration, time management of the shot file is possible by using the reproduction period of the video.

1.2. Operation

Hereinafter, descriptions will be made regarding operations of imaging-transmitting apparatus 100 and cloud server 200 which are configured as described above.

1.2.1. Imaging-Transmitting Apparatus

Figure 8:
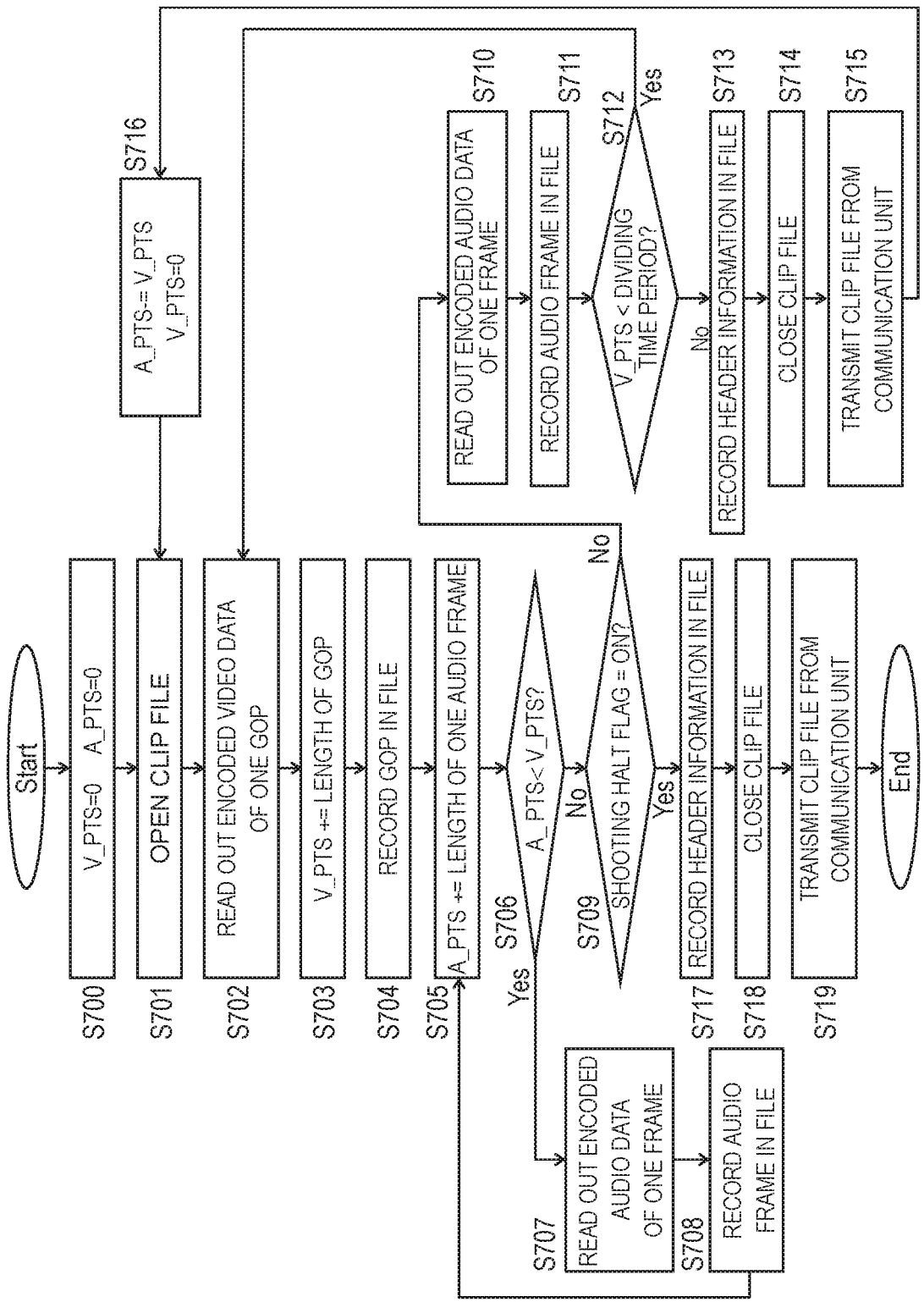
FIG. 8 is a flowchart illustrating the imaging-transmitting apparatus according to the first embodiment.

FIG. 8 is a flowchart illustrating the operation of imaging-transmitting apparatus 100. The operation includes: reading out encoded data which have been stored in video buffer 102 and audio buffer 104, generating clip files; and transmitting the thus-generated clip files to the cloud server.

First, in Step S700, both the counter of "V_PTS" indicating the presentation time stamp of a video frame and the counter of "A_PTS" indicating the presentation time stamp of an audio frame are set to 0 (zero).

Next, in Step S701, for generating the clip file shown in FIG. 5, a clip file is opened in a recording mode.

Next, in Step S702, encoded video data for 1 (one) GOP are read out from video buffer 102.

Next, in Step S703, the reproduction time period of the GOP which has been read out in Step S702 is added to the presentation time stamp "V_PTS."

In Step S704 video output unit 110 of divided-clip generator 107 records the encoded video data for 1 (one) GOP, which have been read out in Step S702, in storage unit 108 with the data having the clip file structure shown in FIG. 5.

In Step S705, the reproduction time period of 1 (one) audio frame, which is currently stored in audio buffer 104 and is to be recorded next, is added to the presentation time stamp "A_VPS."

In Step S706, the presentation time stamp "A_PTS" is compared with the presentation time stamp "V_PTS." When the presentation time stamp "V_PTS" is later (i.e. larger) than the other (Yes, in Step S706), encoded audio data for 1 (one) frame are read out from audio buffer 104 in Step S707.

In Step S708, audio output unit 111 of divided-clip generator 107 records the encoded audio data in storage unit 108, with the data having the clip file structure shown in FIG. 5.

When, in Step S706, the relation that 'the presentation time stamp "A_PTS"'<'the presentation time stamp "V_PTS"' does not hold (No, in Step S706), conditions for halting the shooting are checked in Step S709.

When, in Step S709, 'shooting halt flag=ON' does not hold (No, in Step 709), encoded audio data for 1 (one) frame are read out from audio buffer 104 in Step S710.

Next, in Step S711, audio output unit 111 of divided-clip generator 107 outputs the encoded audio data to storage unit 108, with the data having the clip file structure shown in FIG. 5.

Next, in Step S712, the dividing time period designated by setting unit 105 is compared with the presentation time stamp "V_PTS." When the relation that 'the presentation time stamp "V_PTS"<the dividing time period' holds (i.e. the stamp has yet to reach the end of the dividing time period) (Yes, in Step S712), the operation repeats Step S702 and subsequent ones to continue the output processing of the clip file for the next GOP.

Next, when, in Step S712, the relation that 'the presentation time stamp "V_PTS"<the dividing time period' does not hold (i.e. the stamp is past the end of the dividing time period) (No, in Step S712), the operation is performed as follows: In Step S713, header output unit 112 of divided-clip generator 107 records the information as header data having the structure of the clip file shown in FIG. 5. Such information includes the addresses and reproduction time periods of the data of the video and audio that have been output so far.

In Step S714, the clip file is closed. Here, the clip file which is output in Step S714 has the structure of clip type "A" shown in FIG. 6.

Next, in Step S715, the clip file which has been produced in Step S714 is transmitted to the server via the communication unit. The transmission processing of the clip file in Step S715 is out of synchronization with other steps.

Next, in Step S716, both the counter of "V_PTS" indicating the presentation time stamp of the video frame and the counter of "A_PTS" indicating the presentation time stamp of the audio frame are reset. Then, the next clip file is generated by performing Step S701 and subsequent ones. Here, as shown in FIG. 6, the presentation time stamp "A_PTS" of the starting audio is a value equal to not smaller than 0 (zero).

When, in Step S709, 'shooting halt flag=ON' holds (Yes, in Step 709), the operation is performed as follows: In Step S717, header output unit 112 of divided-clip generator 107 records the information as header data having the structure of the clip file shown in FIG. 5. Such information includes the addresses and reproduction time periods of the data of the video and audio that have been output so far.

In Step S718, the clip file is closed. Here, the clip file which is output in Step S718 has the structure of clip type "B" shown in FIG. 6.

Next, in Step S719, the clip file which is the last clip # n generated in Step S718 is transmitted to cloud server 200 via the communication unit. This completes the transmission of all the clip files.

1.3. Advantages and Others

As described above, in the embodiment, imaging-transmitting apparatus 100 includes: video codec 101, video buffer 102, audio codec 103, audio buffer 104, setting unit 105, controller 106, divided dip generator 107, storage unit 108, and communication unit 109. During the time from a start to an end of shooting, divided-clip generator 107 generates a shot from both video signals received from a camera and audio signals received from a microphone, based on reproduction time periods of the video frames and audio frames. Such a shot configured with a plurality of clip files based on the time concept shown in FIG. 6.

With this configuration, communication unit 109 is capable of transmitting the clip files, sequentially during the shooting, to cloud server 200. Cloud server 200 is capable of combining the thus-received clip files sequentially, thereby presenting the latest video to display apparatus 205. Moreover, each of the clip files is one without any missing video frame and audio frame, and the combined clips are seamlessly connected to each other regarding video and audio, which allows the management of the clips on a video frame basis. Therefore, cloud server 200 can provide, to the display apparatus, the latest video file suited for video editing.

Other Exemplary Embodiments

As described above, the first embodiment has been described to exemplify the technology disclosed in the present application. However, the technology according to the present disclosure is not limited to the embodiment, and is also applicable to embodiments that are subjected, as appropriate, to various changes and modifications, replacements, additions, omissions, and the like. Moreover, the technology disclosed herein also allows another embodiment which is configured by combining the appropriate constituent elements the first exemplary embodiment described above. Thus, other exemplary embodiments will be described hereinafter.

In the first embodiment, as an example of the setting of the dividing time period of clips, the description has been made using the case where the fixed dividing time period is set as follows: The dividing time period is selected by a user from among the candidates (e.g. 10 seconds, 30 seconds, 60 seconds, 120 seconds, etc.) for the dividing time period of clips, via a user interface. Then the thus-fixed dividing time period is transmitted to controller 106 via setting unit 105. However, setting unit 105 does not necessarily have to set the same dividing time period for each of the clips. That is, for example, setting unit 105 may set a rather short dividing time period (e.g. 10 seconds) for the first clip (clip #0); the first clip can be instantly transmitted from communication unit 109 to cloud server 200. Then, for each of clip #1 and subsequent ones, the dividing time period is set to a longer time than that for clip #0. This configuration enables the cloud server to instantly receive the clip file of clip #0. Moreover, it is possible to reduce the number of divided clips, resulting in a reduction in overhead of file transmissions and file capacities.

In the first embodiment, as an example of the generation of the shot file, the description has been made using the case where controller 203 generates the shot file. However, the combining processing of clips may be performed at a time when display apparatus 205 reproduces the clips. This is because the information on video and audio is managed in the header data of each of the clip files, and because the encoded data of each of the clip become seamless data when decoded. That is, display apparatus 205 may include a combination unit. Moreover, the combining of clips may be performed by combining clips that are contained in any time span; therefore, the combining is not limited to the case where the clips are combined sequentially from the first.

In the first embodiment, as an example of the time concept of multiplexed data, the description has been made using the configuration in which the number of video frames contained in 1 (one) GOP is 30; however, the number of video frames contained in 1 (one) GOP may be any number or, alternatively, a variable number.

In the first embodiment, as an example of the time concept of the multiplexed data, the description has been made using the case where the frame length of video data is 30 fps. However, the frame length of video data is not limited to 30 fps. This is because, whatever the frame length is, it is not possible to cause the reproduction time of audio to coincide always with the reproduction time of video at any boundary between the GOPs. Likewise, the frame length of audio is not limited to 48 fps.

In the first embodiment, as an example of the structure of the clip files, the description has been made using the case where the clip files have the MP4 file structure. However, it is only required for the clip files to have the structure in which the time information and metadata can be described in a single file such that multiplexing and access (random access) can be easily performed at any time. Therefore, the clip files are not limited to the MP4 files.

In the first embodiment, as an example of the time concept of the clips, the description has been made using the configuration in which there exists a relation that the difference (time period "ß") in reproduction end time between the last audio frame and the last video frame, which are positioned at the end of clip # n, is smaller in time duration than 1 (one) audio frame. However, the relation may be achieved in the following manner. That is, the difference in reproduction end time between the last audio frame and the last video frame, which are positioned at the end of clip # n, is set equal in temporal structure to the corresponding difference in each of clips #0 to # n−1. Then, when the clips are combined by either cloud server 200 or display apparatus 205, the last audio frame at the end is deleted, thereby achieving the relation.

In the first embodiment, the description s been made using the configuration which display apparatus 205 is disposed separately from cloud server 200. However, cloud server 200 may include display apparatus 205. In this case, display apparatus 205 receives shot files or clip files from storage unit 202 of cloud server 200, and displays them.

Moreover, because the aforementioned embodiments are used only for the exemplification of the technology disclosed herein, it is to be understood that various changes and modifications, replacements, additions, omissions, and the like may be made to the embodiments without departing from the scope of the appended claims or the scope of their equivalents.

INDUSTRIAL APPLICABILITY

The technology according to the present disclosure is applicable to imaging apparatuses that perform video recording processing and video transmitting processing, adaptively in accordance with the actions of the technology disclosed herein. Specifically, the technology disclosed herein is applicable to digital still cameras, movie cameras, cellular telephones with camera functions, smartphones, and the like.

What is claimed is:

1. A video transmission system, comprising:
   a video output unit configured to:
      receive video data; and
      divide the video data into a plurality of video clips, including a first video clip, based on a frame rate of the video data;
   an audio output unit configured to:
      receive audio data; and
      divide the audio data into a plurality of audio clips, including a first audio clip, based on a frame rate of the audio data,
      wherein the video and audio output units divide the video and audio data such that a beginning time of the first video clip is the same as a beginning time of the first audio clip, and an end time of the first video clip is before an end time of the first audio clip;
   a transmission unit for sequentially transmitting, to a server via a network, the plurality of video clips divided by the video output unit, and for sequentially transmitting, to the server via the network, the plurality of audio clips divided by the audio output unit; and
   a display apparatus for displaying the plurality of video clips that have been transmitted,
   wherein the plurality of video clips includes a final video clip, the plurality of audio clips includes a final audio clip, and an end time of the final video clip is after an end time of the final audio clip.

2. The video transmission system according to claim 1, wherein the first video clip is transmitted from the transmission unit to the server after the first video clip has been generated.

3. The video transmission system according to claim 1, wherein the plurality of video clips includes a second video clip, and the display apparatus displays the first and second video clips that are combined with each other.

4. The video transmission system according to claim 3, further comprising a setting unit for setting a time period of the first video clip.

5. The video transmission system according to claim 4, wherein the setting unit sets a time period of the second video clip such that the time period of the first video clip is different from the time period of the second video clip.

6. The video transmission system according to claim 1, wherein the plurality of video clips includes a second video clip, the plurality of audio clips includes a second audio clip, and a beginning time of the second video clip is before a beginning time of the second audio clip, and an end time of the second video clip is after an end time of the second audio clip.

7. The video transmission system according to claim 6, wherein the end time of the final video clip is after the end time of the final audio clip by an amount less than an audio-frame-duration amount.

8. The video transmission system according to claim 1, wherein the frame rate of the audio data is larger than the frame rate of the video data.

9. A video transmission method, comprising:

receiving video data;

dividing the video data into a plurality of video clips, including a first video clip, based on a frame rate of the video data;

receiving audio data;

dividing the audio data into a plurality of audio clips, including a first audio clip, based on a frame rate of the audio data;

sequentially transmitting, to a server via a network, the plurality of video clips, and sequentially transmitting, to the server via the network, the plurality of audio clips; and displaying on a display apparatus the plurality of video clips that have been transmitted, wherein a beginning time of the first video clip is the same as a beginning time of the first audio clip, and an end time of the first video clip is before an end time of the first audio clip, and wherein the plurality of video clips includes a final video clip, the plurality of audio clips includes a final audio clip, and an end time of the final video clip is after an end time of the final audio clip.

10. The video transmission method according to claim 9, wherein the plurality of video clips includes a second video clip, the plurality of audio clips includes a second audio clip, and a beginning time of the second video clip is before a beginning time of the second audio clip, and an end time of the second video clip is after an end time of the second audio clip.

11. The video transmission method according to claim 9, wherein the frame rate of the audio data is larger than the frame rate of the video data.

12. The video transmission method according to claim 9, wherein the end time of the final video clip is after the end time of the final audio clip by an amount less than an audio-frame-duration amount.

\* \* \* \* \*